M. W. STUART.
MOTOR CYCLE.
APPLICATION FILED JUNE 6, 1911.

1,035,917.

Patented Aug. 20, 1912.

Witnesses

Inventor
Moses W. Stuart

UNITED STATES PATENT OFFICE.

MOSES W. STUART, OF MONTGOMERY, ALABAMA.

MOTOR-CYCLE.

1,035,917.  Specification of Letters Patent. Patented Aug. 20, 1912.

Application filed June 6, 1911. Serial No. 631,662.

*To all whom it may concern:*

Be it known that I, MOSES W. STUART, a citizen of the United States, and a resident of the city and county of Montgomery, State of Alabama, have invented certain new and useful Improvements in Motor - Cycles, of which this is a specification, reference being had to the accompanying drawing, forming part hereof.

The invention relates to motorcycles in which the running gear, motor and related mechanism, are more or less completely housed or incased, and its object is to provide in combination with the necessary parts of a motorcycle such means for housing or casing the operating parts as to effectually prevent soiling or burning the garments of the rider and to render a motor cycle as cleanly a vehicle as an automobile.

Figure 1:
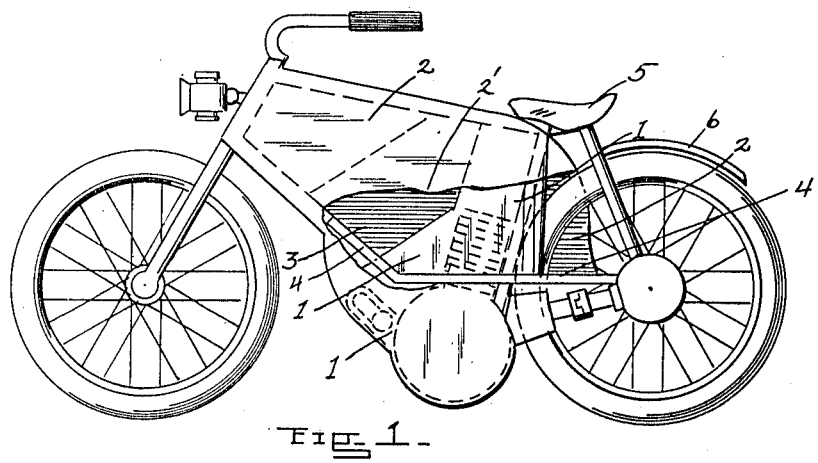
Figure 2:
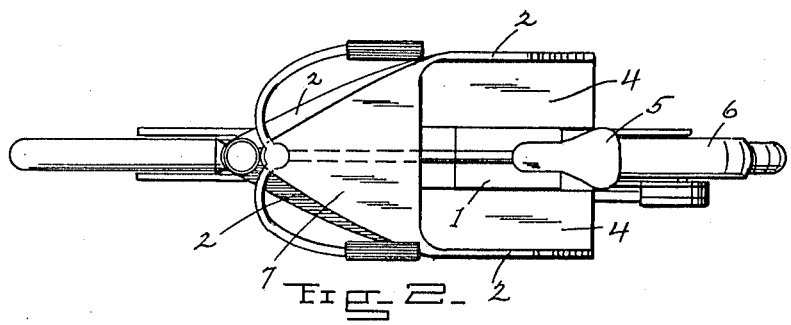
Figure 3:
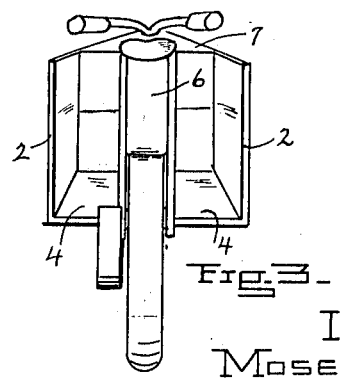

The drawing, which shows the invention, has in Figure 1 a side elevation of a motorcycle with a portion of the housing broken away, in Fig. 2, a plan or bird's eye view of the complete machine, and in Fig. 3, a rear elevation showing the arrangements of internal and external housings, seat, etc.

In carrying the invention into practice I provide first a housing or casing for the motor and related parts, preferably employing a drive of the bevel gear type as more readily incased. For reasons of cleanliness and as a part of the invention I dispense with cranks and pedals, preferring to start the machine as a cyclist does when mounting from a rear step—that is by a push from the rear before mounting. I incase the forward part of the frame by sides and top of thin material, sheet metal for example, and provide side extensions at the rear presenting an appearance not unlike that of an ancient chariot.

In Fig. 1 1 is the housing or case for the motor and motor parts, covering motor, carbureter, magneto, etc., and which preferably has suitable openings for the purpose of reaching these elements, which may be suitably disposed (but form no part of the invention). 2 is the housing or casing over the frame, shown broken away at 2', so as to disclose both the motor housing 1, and the rearward wall of the external housing beyond the motor-housing and rear-wheel. In front of the motor housing is a space 3, to accommodate the feet of the rider, his legs (as will be seen from Fig. 2) being placed on opposite sides of the motor housing.

Suitable foot boards as at 4, 4, provide a floor and a foot rest. 5 is the saddle, 6 a mud guard over the rear wheel, and 7 (Fig. 2) the top of the front or main casing. As the driving mechanism forms no part of the invention except as combined with the housing elements, none of it is shown but it is merely indicated as within the casing.

It will be seen by reference to Fig. 2 that there is a sort of torpedo-shaped front, the main housing beginning at the front of the frame and widening out as it extends rearwardly, thus forming a space within which can be carried gasolene and oil tanks, bateries, etc., the roof of this space being shown at 7. Beyond this roofed portion the casing is carried rearwardly merely as side guards and a bottom, composed of the members 4, 4, the space inclosed being, as said before, similar to a chariot body. Extending upward in this space are the motor casing and rear forks, (see Fig. 1, and also the rear view of Fig. 3) the floor formed by 4, 4, being wide enough for comfortable disposition of the feed in mounting. For purposes of ventilation I provide in front of the motor casing an inclined portion which serves as an air duct and which may be provided with one or more air-inlets just above the position of the magneto.

The construction of the internal and external casings and the chariot-like formation of the body inclosing the saddle post, motor casing, etc., will be well understood by reference to the figures. It will be seen that all of the operating parts are well inclosed and that the garments of the rider are fully protected. If desired the internal casing can be carried to the rear sufficiently to inclose the whole upper half of the rear wheel but ordinarily this will not be necessary, the extension shown in Fig. 1 being sufficient.

Constructed as shown a motorcycle may be used without danger to garments precisely as may an automobile; the feet may be disposed comfortably within the space provided for them and the external casing forms an efficient wind-shield.

Having described my invention, what I claim is:—

1. In combination with a motorcycle, an external casing extending from the front of the frame to a point substantially rearward to the motor, said casing substantially wider at the rear than in front, a floor between the rearward walls of said casing, and an internal casing over the motor extending upwardly through said floor and between the side-walls of said external casing.

2. In combination with a motor cycle, a body casing provided with a floor and formed with said floor into a rearwardly open and substantially chariot-shaped inclosure, and provided with a substantially wedge-shaped front terminating substantially at the front of the frame of the motor cycle, substantially as set forth.

Witness my hand this 5th day of May, 1911.

MOSES W. STUART.

In the presence of—
 THOMAS J. SCOTT,
 DAISY JONES.

Copies of this patent may be obtained for five cents each, by addressing the "Commissioner of Patents, Washington, D. C."

Correction in Letters Patent No. 1,035,917.

It is hereby certified that in Letters Patent No. 1,035,917, granted August 20, 1912, upon the application of Moses W. Stuart, of Montgomery, Alabama, for an improvement in "Motor-Cycles," an error appears in the printed specification requiring correction as follows: Page 1, line 110, for the word "to" read *of;* and that the said Letters Patent should be read with this correction therein that the same may conform to the record of the case in the Patent Office.

Signed and sealed this 3rd day of December, A. D., 1912.

[SEAL.]            C. C. BILLINGS,

*Acting Commissioner of Patents.*